(12) United States Patent
Horrdin et al.

(10) Patent No.: US 8,060,168 B2
(45) Date of Patent: Nov. 15, 2011

(54) DUST SEALING TAPE AND DISPLAY USING SAME AND METHOD OF SEALING

(75) Inventors: Karl Magnus Horrdin, Loddekopinge (SE); Henrik Erland Hojer, Sodra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1054 days.

(21) Appl. No.: 11/924,849

(22) Filed: Oct. 26, 2007

(65) Prior Publication Data

US 2009/0054115 A1 Feb. 26, 2009

Related U.S. Application Data

(60) Provisional application No. 60/956,839, filed on Aug. 20, 2007.

(51) Int. Cl.
*H04M 1/00* (2006.01)
*G05F 1/16* (2006.01)
*B23P 19/00* (2006.01)
*G02F 1/1333* (2006.01)

(52) U.S. Cl. ............... 455/575.8; 361/679.57; 29/729; 349/58

(58) Field of Classification Search ............ 455/575.8; 361/679.57; 29/729; 349/58
See application file for complete search history.

(56) References Cited

U.S. PATENT DOCUMENTS

| | | | |
|---|---|---|---|
| 6,230,028 B1 | 5/2001 | Shirakawa | |
| 7,920,225 B2 * | 4/2011 | Nishikawa et al. | 349/60 |
| 2005/0030707 A1 * | 2/2005 | Richardson et al. | 361/681 |
| 2006/0133018 A1 * | 6/2006 | Okuda | 361/681 |
| 2006/0232915 A1 * | 10/2006 | Chou et al. | 361/681 |

FOREIGN PATENT DOCUMENTS

| | | |
|---|---|---|
| DE | 20 2005 014 408 U1 | 4/2006 |
| JP | 2005 333290 | 12/2005 |
| WO | WO 02/054725 A1 | 7/2002 |
| WO | WO 2009024842 A1 * | 2/2009 |

OTHER PUBLICATIONS

International Preliminary Report on Patentability corresponding to PCT/IB2008/000378, completion of this report is Jul. 15, 2009.
International Search Report corresponding to PCT/IB2008/000378, mailed Jul. 25, 2008.
Written Opinion of the International Searching Authority corresponding to PCT/IB2008/000378, mailed Jul. 25, 2008.

* cited by examiner

*Primary Examiner* — Mike Qi
(74) *Attorney, Agent, or Firm* — Renner, Otto, Boisselle & Sklar, LLP

(57) ABSTRACT

A mounting system for a display includes support structure to support a display and viewing window in spaced apart relation, and a flexible attachment sealing the space between the window and display and adapted to hold the window to the support structure. A display system includes such mounting system. The flexible attachment includes a first annular ring of double sided adhesive tape adapted to attach to a window, a second annular ring of double sided adhesive tape adapted to attach to both a retainer and a display, and an interface of non-adhesive material between and adhesively adhered to both annular rings of double sided adhesive tape. A method of assembling a display system includes placing a display in a support housing, pressing the dust sealing tape against the display, and applying a protective window over the display and pressing it against the dust sealing tape.

19 Claims, 4 Drawing Sheets

DUST SEALING TAPE AND DISPLAY USING SAME AND METHOD OF SEALING

CROSS-REFERENCE TO RELATED APPLICATION

This application claims the benefit of U.S. Provisional Patent Application Ser. No. 60/956,839, filed Aug. 20, 2007, the entire disclosure of which is hereby incorporated by reference.

TECHNICAL FIELD

The present invention relates generally, as indicated, to dust sealing tape, a display using dust sealing tape, and a method of sealing, and, more particularly, such dust sealing tape and method used in connection with a display, such as a liquid crystal display (LCD), mounting the LCD in a support or retainer such as, for example, in a portable communication device.

BACKGROUND

Various techniques have been used to mount displays in support or retention structures, for example, in the housing or case of a portable communication device. Sometimes a window is located in spaced apart protective relation to the viewing surface of a display so that the viewing surface can be viewed through the window. Foam gaskets, for example, made of polyurethane foam (sometimes referred to as PU foam) or made of other foam materials, have been placed between the window and display to block dust from the space. For example, the dust may interfere with a clear view of the display surface.

One problem with using foam gaskets is that they add a force on the window from the inside, i.e., from the display side, tending to push the window away from the display and the support structure. When the window or the device in which the window is mounted is exposed to heat and/or moisture, such pushing force may cause the window to fall off the device. Another problem with such foam gaskets is that they are relatively thick and their functional working span (tolerance) may be smaller than the tolerance between the window and the display in relatively thin devices, e.g., in relatively thin "stackups" desired for thin devices, e.g., relatively thin portable communication devices, in which the window and display are used. In such circumstances a foam gasket may not work adequately to provide desired dust sealing.

SUMMARY

One aspect of the invention relates to a mounting system for a display, including a support structure adapted to support a display and a viewing window in spaced apart relation to the display, and a flexible attachment sealing the space between the window and the display and adapted to hold the window to the support structure.

Another aspect relates to such mounting system, wherein said support structure includes a recess in which a display may be positioned, and said flexible attachment having two surfaces, one surface positioned with respect to the support structure and attached thereto by adhesive and also attachable to a display in the recess, and the other surface exposed for attachment to a viewing window.

Another aspect relates to such mounting system, wherein said support structure has a step recess about at least a portion of said recess and in which a viewing window may be positioned, said stepped recess having a surface, and said one surface of said support structure being adhered to said stepped recess surface by adhesive.

Another aspect relates to such mounting system, wherein said flexible attachment includes a flexible portion providing a bend maintaining integrity of the flexible attachment between a portion thereof attached to the support structure and a portion thereof attachable to a display in said recess to accommodate displays of different respective thickness dimensions thereby allowing for a relative height differential between the step recess and a display supported by the support structure.

Another aspect relates to such mounting system, wherein said flexible attachment includes an annular ring including a radially outer portion having adhesive material on both surfaces providing, respectively, adhesive attachment to the support structure and attachable to a viewing window, the annular ring including a radially inner portion having adhesive material on one surface attachable to a display and having a substantially non-adhesive surface exposed to but not attachable to a viewing window.

Another aspect relates to such mounting system, wherein said annular ring includes a first annular ring of double sided adhesive tape adapted to attach to a window, a second annular ring of double sided adhesive tape adapted to attach to both said support structure and a display, and an interface of non-adhesive material between and adhesively adhered to both annular rings of double sided adhesive tape.

Another aspect relates to such mounting system, wherein said interface of non-adhesive material includes a foil material.

Another aspect relates to such mounting system, wherein said housing includes a mobile phone housing, and said display includes a mobile phone display.

Another aspect relates to such mounting system, wherein said support structure includes a housing, a display in the housing, and said support structure including a viewing window support surface, a viewing window, and said flexible attachment including one portion adapted to provide an interface between said viewing window support surface and said viewing window, said one portion adhesively attached to both said viewing window support surface and viewing window, said flexible attachment including another portion adhesively attached to said display and including an adhesive-free surface facing said viewing window and unattached to said viewing window, said flexible attachment having flexibility and adapted to permit separation of said viewing window and said display while maintaining a substantially isolated space between said viewing window and said display to block dust from entering such space.

Another aspect relates to a display system, including a housing, a display in the housing, a protective viewing window spaced apart from and aligned for viewing therethrough of the display, and a dust seal between the window and the display attaching the window to the housing and adapted to block dust from space between the window and the display.

Another aspect relates to such display system, wherein the dust seal is attached to the housing, to the viewing window and to the display and is adapted in cooperation with the housing, viewing window and display to block dust from entering the space between the viewing window and the display.

Another aspect relates to such display system, wherein said display comprises a liquid crystal display.

Another aspect relates to such display system, including a portable communication device.

Another aspect relates to such display system including a mobile phone.

Another aspect relates to such display system, wherein said dust seal includes a first annular ring of double sided adhesive tape adapted to attach to said viewing window, a second annular ring of double sided adhesive tape adapted to attach to both a retainer and said display, and an interface of non-adhesive material between and adhesively adhered to both annular rings of double sided adhesive tape.

Another aspect relates to such display system, wherein said housing has a recess, said display positioned at least partly in said recess, said housing having a support surface in generally parallel, spaced apart relation with a surface of said display and substantially circumscribing said recess and adapted to provide support for said viewing window with respect to the housing, said dust seal being in interface relation to said support surface and said viewing window attaching said viewing window to said support surface, and said dust seal attached to said display and in cooperation with said viewing window and display defining a dust sealed space between said viewing window and said display.

Another aspect relates to such display system, said dust seal being flexible to maintain the sealed integrity of said space over a range of variation between said viewing window and said display.

Another aspect relates to a dust seal for a display held in a retainer and protected by a viewing window, including a first annular ring of double sided adhesive tape adapted to attach to a window, a second annular ring of double sided adhesive tape adapted to attach to both a retainer and a display, and an interface of non-adhesive material between and adhesively adhered to both annular rings of double sided adhesive tape.

Another aspect relates to such dust seal, wherein the first and second annular rings and said interface are generally planar, the radial width of said first annular ring is narrower than the radial width of said second annular ring, and the relationship of said first annular ring, said second annular ring and said interface is such that the radial outward portion of said interface has adhesive material at both surfaces thereof provided, respectively, by said first annular ring and said second annular ring, and the radial inward portion of said interface has adhesive material only at one surface thereof provided by said second annular ring.

Another aspect relates to such dust seal, wherein said interface includes a foil material.

Another aspect relates to a sealing tape for a display, including a first annular ring of double sided adhesive tape, a second annular ring of double sided adhesive tape; and an intermediate material between said rings and adhered to both said rings by adhesive material of said rings.

Another aspect relates to a method of assembling a display system using sealing tape that includes a first annular ring of double sided adhesive tape, a second annular ring of double sided adhesive tape; and an intermediate material between said rings and adhered to both said rings by adhesive material of said rings, the method including placing one annular ring of double sided adhesive tape against a surface of a display and against a surface of a retainer in which the display is to be mounted, placing a window in at least partially overlying spaced apart relation to the display and against the other annular ring of double sided adhesive tape thereby to mount the window directly to the sealing tape to hold the window to the retainer.

Another aspect relates to a method of assembling a display system using dust sealing tape, including placing a first annular ring of adhesive material having a relatively wide width against a surface of a display and against a surface of a retainer in which the display is to be mounted, placing a window in at least partially overlying spaced apart relation to the display and against a second annular ring of adhesive material having a relatively narrower width compared to the relatively wide width of the first annular ring of adhesive material, and wherein the two annular rings of adhesive material are adhered together and the window is mounted to the retainer by the annular rings.

Another aspect relates to such method, wherein said placing steps include applying force for the first and second annular rings to adhere, respectively, to a display in the retainer and to said window to provide a dust blocked sealed space between the display and the window.

Another aspect relates to such method, wherein the retainer includes a housing of a portable communication device, and further including placing a display in the housing.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views.

DESCRIPTION

Figure 1:
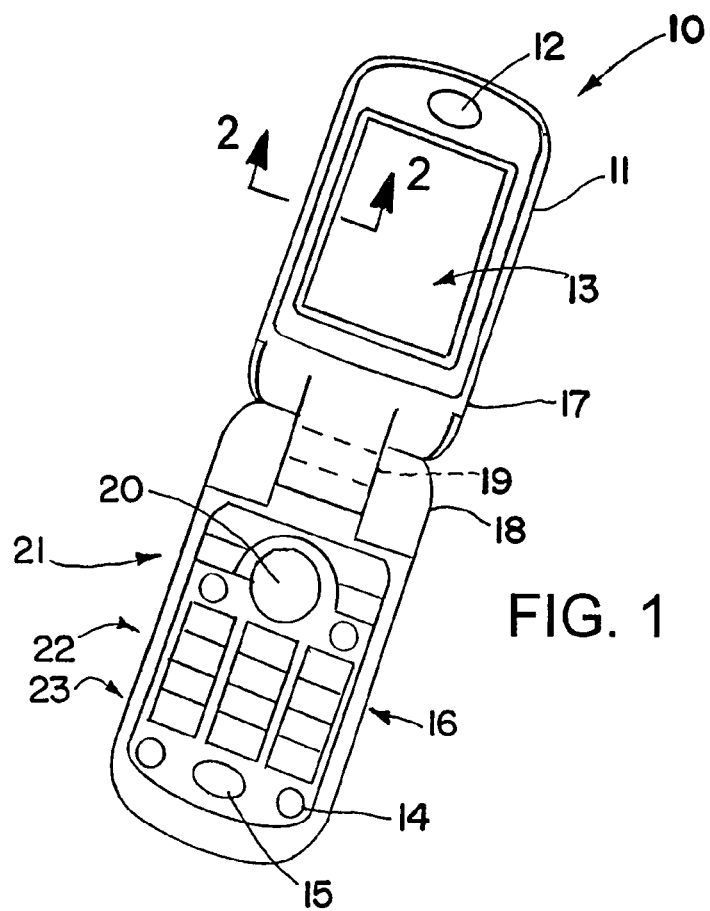
FIG. 1 is a schematic illustration of a portable communication device, e.g., in the form of a portable telephone.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

As used herein, the term "portable communication device" includes portable radio communication equipment. Portable communication device and mobile communication device may be used synonymously. The term "portable radio communication equipment," which may be referred to below as a portable phone (or telephone), a portable device, a portable radio terminal or a portable terminal, includes all electronic equipment, including, but not limited to, mobile telephones, pagers, communicators, i.e., electronic organizers, smartphones, personal digital assistants (PDAs), or the like. While the present invention is being discussed with respect to portable (or non-portable) communication devices, it is to be appreciated that the invention is not intended to be limited to portable communication devices, and can be applied to any type of electronic equipment capable of being used for voice and/or data communication.

As will be appreciated, the invention may be used with portable telephones, other telephones, personal digital assistants (PDA), computers, other communication devices, etc.; for brevity, the invention will be described by way of example with respect to portable telephones, for example, mobile phones, but it will be appreciated that the invention may be used with other communication devices.

Referring in detail to the drawings, wherein like parts are designated by like reference numerals in the several drawing figures, a portable communication device in accordance with an embodiment of the present invention is illustrated generally at 10 in FIG. 1.

The portable communication device will be referred to below as a mobile phone. However, as was mentioned above, reference to "mobile phone" includes various other devices, such as, for example, those mentioned above. In outward appearance, for example, as is illustrated in FIG. 1, the mobile phone is of one type of design or style; however, the features of the invention, as are described in further detail below, may be used in other types of mobile phones, such as those with or without cases that open and close, and various other mobile phones that currently exist or may come into existence in the future.

The mobile phone 10 includes housing 11 (sometimes referred to as a case), speaker 12, display system 13, e.g., including a liquid crystal display, light emitting diode display, or other display, on/off switch 14, microphone 15 and a number of keys generally indicated at 16. In the illustrated embodiment the housing is in two parts, which are referred to as display housing 17 and key housing 18, that are mechanically connected by a hinge 19. Mobile phones with such multipart housings are known. Features of the invention, which are described below, may be used with other types of housings, one example of which is a one part housing.

The keys 16 may include a number of keys having different respective functions. For example, the key 20 may be a navigation key, selection key or some other type of key. As an example, the navigation key may be used to scroll through lists shown on the display system 13, to select one or more items shown in a list on the display system 13, etc. Keys 21 may be, for example, soft keys or soft switches to select a function shown on the display system 13, for example, and/or may be special function keys, such as calendar, internet connection, messaging, telephone, etc. Keys 21 also may include one or more keys to initiate a telephone call, to answer a telephone call or to end a telephone call. Keys 22 may be dialing keys, e.g., as are used in a conventional telephone dialing keypad or keyboard 23, including keys marked 1 through 0 plus the asterisk "*" and the pound or hash "#" symbols and/or also with other alphanumeric characters and/or other symbols. The speaker 12, display system 13, on/off switch 14, microphone 15, navigation key 20, soft keys 21, and dialing keys 22 may be used and function in the usual ways in which a mobile phone typically is used, e.g. to initiate, to receive and/or to answer telephone calls, to end a telephone call, to send and to receive text messages, to connect with and carry out various functions via a network, such as the Internet or some other network, to beam information between mobile phones, etc. These are examples of uses; there may be other uses, too, that currently exist or may come into existence in the future.

Figure 2:
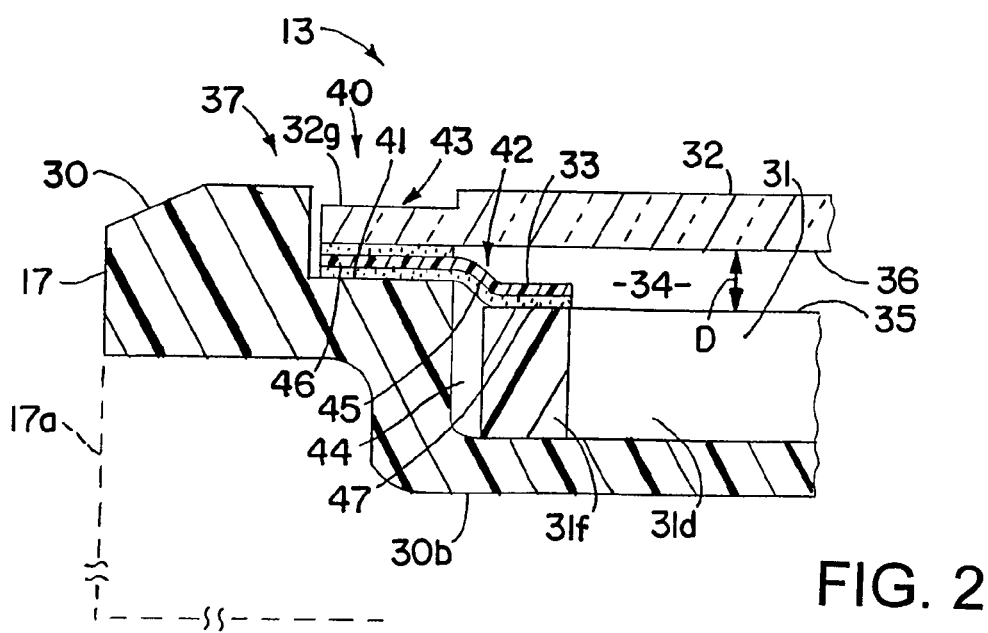
FIG. 2 is a schematic fragmentary section view of a dust sealing tape mounting system for a display and window of a display system in accordance with an embodiment of the present invention, the illustration being provided in section view looking generally along the lines 2-2 of FIG. 1, the opposite side of the display system, e.g., relatively to the right as shown in FIG. 2, being generally the mirror image of what is illustrated in FIG. 2.
Figure 3:
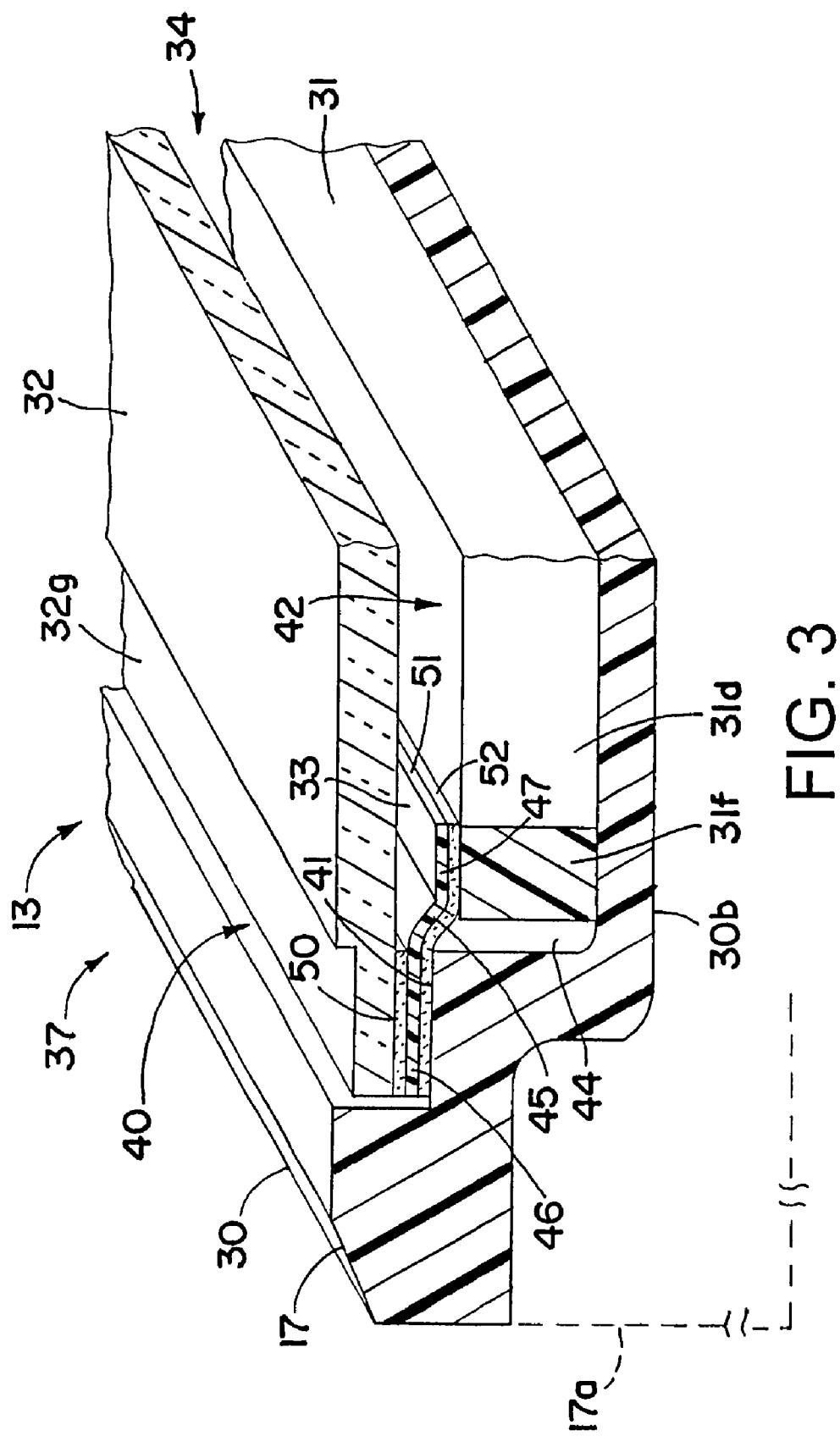
FIG. 3 is a fragmentary isometric section view of the dust sealing tape mounting system of a display system as in FIG. 2.

Turning to FIGS. 2 and 3, a display system 13 in accordance with an embodiment of the invention is illustrated. The display system 13 includes a front part 30 (sometimes referred to as "front" of the display housing 17 (also see FIG. 1)), display 31, protective window 32, and dust seal 33 (sometimes referred to herein as dust sealing tape). The window 32 may spaced apart from the display 31 leaving a space 34 there between. The window 32 is in generally overlying relation to the display 31 to provide protection for the display, e.g., to avoid damage to the display, and to allow the display to be viewed through the window. The window may have a groove 32g in the top surface thereof to facilitate placing a label. The actual distance D between the display surface 35 and surface 36 of the window 32, which surfaces face or confront each other, may be different in different respective mobile phones; for example, the distance D may depend on variations in the dimensional tolerances of the display housing 17, display 31, and window 32. As an example, for a relatively thin mobile phone the distance D between the window and display may be approximately 0.37 millimeters with tolerance variation of approximately plus or minus 0.2 millimeters. This means that the dimensional range is from a minimum of approximately 0.17 millimeters to approximately 0.57 millimeters.

A mounting system 37 for the display system 13 includes the housing 10, e.g., the display housing 17, that is adapted to support the display 31 and the window 32 in spaced apart relation. The mounting system includes a flexible attachment, e.g., provided by the dust seal 33, that seals the space 34 between the display 31 and the window 32 and also holds the window to the front 30. As is shown in the drawings, such space 30 is somewhat isolated so dust does not enter the space.

The dust seal 33 is in the form of a multilayer, flexible dust sealing tape. The dust sealing tape 33 provides a dust seal (and sometimes is referred to herein as dust seal) between the display surface 35 and the window 32 to block dust from entering the space 34. The dust seal 33 also attaches the window 32 to the display housing 17. The dust seal 33 provides the sealing and attaching functions while accommodating variations in the tolerances that affect the distance or dimension D of the space 34, and, as is illustrated, the dust seal tends to isolate the space blocking dust or the like from entering the space.

As is seen in FIGS. 2 and 3, the front 30 of the display housing 17 is in solid lines, and is shown in section to facilitate illustrating the manner in which the display 31 and window 32 are mounted in the display housing 17 using the dust seal 33. The other portion 17a of the display housing 17 in which electrical connections, circuit boards, etc., may be contained is shown in dotted lines in the illustration.

The display housing 17 is a support or retainer for the display 31 and window 32. As is illustrated, the display housing 17 includes a mounting recess 40 in which the display 31 and window 32 are mounted. The mounting recess 40 includes a step surface 41 between a relatively narrower display recess 42 of the mounting recess 40 and a relatively wider window recess 43. The display 31 may be secured to the front part 30 of the display housing 17 by clips or the like (not shown). The dust seal 33 is attached between the surface 36 of the window 32 and the step surface 41 and thereby attaches the window to the display housing 17. The dust seal 33 also is attached to the display 31 and provides the dust seal function described herein with regard to the space 34. The area 44 in the display recess 42 where the display 31 is located is not necessarily free of dust. The area 44 and other parts of the display recess 42 that do not include the space 34 may include electrical contacts, conductors, and/or other parts of the mobile phone that connect mechanically and/or electrically to the display 31 to allow the display to be operated in the usual fashion to provide viewable information, images, etc., for viewing through the window 32 by a user of the mobile phone 10. The dust seal 33 blocks dust from entering the space 34 and dirtying the display surface 35 and window surface 36, and helps to avoid or to prevent dust from degrading the quality of information and images seen by a user.

The dust seal 33 is flexible to accommodate variations in tolerances, e.g., thicker or thinner displays 31, thicker or thinner windows 32, variations in housing dimensions, e.g., depth of the display recess 42 relative to the location of the step surface 41, etc. As is seen in FIGS. 2 and 3, for example, there is a bend 45 in the dust seal between the portion 46, which is directly between and attached to the window 32 and step surface 41, and the portion 47, which is attached to the display 31. If the display 31 were of a lower height than illustrated then the bend 45 may be at a greater or steeper angle and length than that shown in FIGS. 2 and 3, e.g., to reach down into the display recess 42 for the dust seal 33 to attach to the display 31. Similarly, if the height of the display 31 above the bottom of the display recess 42 were greater than illustrated, then the bend 45 would be at a lesser angle than that illustrated in FIGS. 2 and 3.

The dust seal 33 is accommodating to different types of displays 31. For example, the display 31 that is illustrated in FIGS. 2 and 3 may be a liquid crystal display 31d of conventional design or of a new design; and the liquid crystal display 31d may be held in a frame 31f. For convenience of description, the frame 31f and liquid crystal display 31d are referred to collectively as the display 31; it will be appreciated that the dust seal 33 may be attached to the frame, to the liquid crystal display, or to both. As is known, manually pressing against the display surface 35 of a liquid crystal display 31d may damage the display. Touching of the display surface 35 also may damage such display surface, e.g., scratching, leaving grease or fingerprints on the surface, etc. The window 32 protects such a liquid crystal display 31d preventing the pressing, touching, scratching, etc. of the liquid crystal display. The display 31 may be other than a liquid crystal display, and it will be appreciated that the height dimension D of the space 34 between the display surface 35 and the surface 36 of the window 32 may be different for different height display, different depth display recesses 42, etc. The flexibility of the dust seal 33 easily accommodates those different dimensions and tolerances of the various parts of the display system 13 to block dust from the space 34 and to maintain attachment of the window 32 to the housing 17.

The housing 11 in which the display 31 and window 32 are mounted is referred to as the display housing 17 since in the illustrated embodiment the mobile phone 10 is of the two part type, e.g., in which the display housing 17 can be pivoted about the hinge 19 relative to the keyboard housing 18 for use of the mobile phone. However, it will be appreciated that for a mobile phone that has only a single or one part housing, e.g., whereby a display housing does not have to be opened relative to a keyboard housing, the display 31 and window 32 may be mounted in and attached to such one part housing.

Figure 4:
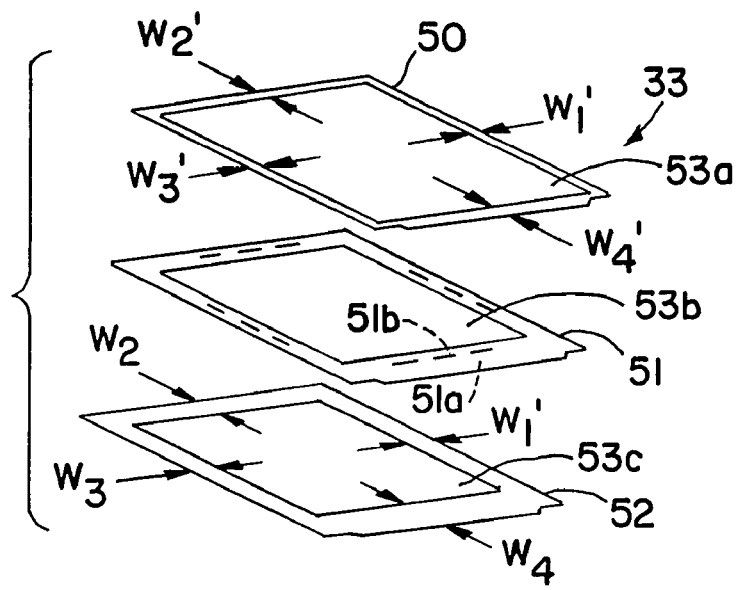
FIG. 4 is an exploded isometric view of the components of dust sealing tape in accordance with an embodiment of the present invention.
Figure 5:
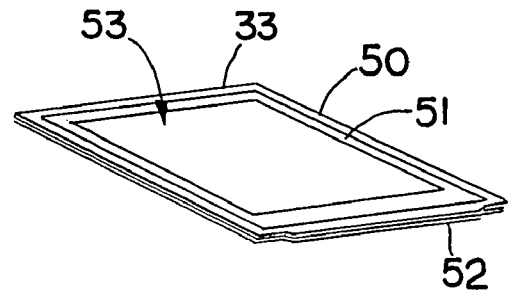
FIG. 5 is an isometric view of the assembled dust sealing tape.

Turning to FIGS. 4 and 5, the dust seal 33 in the form of dust sealing tape is shown. The dust seal 33 includes three layers 50, 51 and 52, each of which is in the shape of an annular ring having an open area 53a, 53b, 53c, collectively designated as open area 53 in FIG. 5. The external dimensions of the annular rings 50-52 are the same and are coordinated with, e.g., are the same or nearly the same as, the size and shape of the mounting recess 40 (FIGS. 2 and 3) to fit in the mounting recess supported by the step surface 41 in the manner illustrated in FIGS. 2 and 3. As shown in the drawings the annular rings 50-52 are generally planar or flat. The size and shape of the open areas 53b, 53c of the layers 51, 52 are the same, e.g., the width dimension $W_1$-$W_4$ of the respective sides of the layers 51 and 52 are the same. The width dimensions $W_1'$-$W_4'$ of the sides forming the layer 50 are smaller than the width dimensions of the sides of the layers 51 and 52; and, therefore, the open area 53a of the layer 50 is larger than the open areas 53b, 53c of the layers 51 and 52, respectively.

The layer 50 is a first double-sided adhesive layer having a central base or support on which adhesive material is on both the top and bottom surfaces, e.g., relative to the illustration in FIG. 4. (It will be appreciated that directions, e.g., top and bottom, are used for convenience of description herein but are not necessarily limiting to the invention.) The layer 52 is a second double-sided adhesive layer and may be the same or different material as the layer 50, e.g., having a central support portion and adhesive material on both the top and bottom surfaces thereof relative to the illustration in FIG. 4. The layer 51 may be a relatively thin foil material, such as, for example, a plastic foil. The layer 51 may be some other material. Exemplary materials for the layer 51 may include polymer materials, electrically non-conductive materials, polyethylene terephthalate, or other materials. The layer 51 does not have adhesive material as part thereof, but it may be attached to the layers 50, 52 by adhesive material thereof. Accordingly, the layer 51 provides an intermediate layer or interface between the double-sided adhesive layers 50, 51.

The materials of which each of the layers 50-52 are made are of adequate flexibility to allow the bend 45 (FIGS. 2 and 3) to be formed therein while providing a secure seal blocking dust from entering the space 34, as is described above. The materials of which the layers 50-52 are formed also have adequate integrity to block dust from entering the space 34 as used in the manner illustrated in FIGS. 2 and 3, for example.

In assembling the annular ring layers 50-52 of the dust sealing tape of the dust seal 33, the three layers are placed in overlying relation and pressed together, e.g., they are sandwiched together. The adhesive material on the bottom of the layer 50 adheres securely to the top surface of the layer 51; and the adhesive material on the top of the layer 52 adheres securely to the bottom of the layer 51. Since the size and shape of the foil layer 51, including the width of the respective sides thereof, are the same as those of the second double sided adhesive layer 52, the layer 51 covers entirely or at least substantially entirely the adhesive material that is on the top surface of the second double sided adhesive layer 52 and tends to block exposing such adhesive material from the surface 36 of the window 32 when placed in use in the manner illustrated in FIGS. 2 and 3. The first layer of double-sided adhesive 50 covers only the radially outward surface portion 51a of the top surface of the foil layer 51. The radially inward surface portion 51b at the top surface of the foil layer 51 is not covered by the layer 50 and, therefore, is otherwise exposed as seen in FIG. 5. Therefore, there is no adhesive on the radially inward surface portion of the dust seal 33 where the bend 45 (FIGS. 2 and 3) may be formed and above the area where the dust seal is attached to the display 31. Thus, the dust seal 33 will not tend to adhere to the surface 36 of the window 32 in the area of the bend and the area where the dust seal is attached to the display. This feature tends to avoid the possibility of the dust seal 33 being assembled incorrectly with regard to the display 31 and window 32 without secure attachment to the display and to the window, for example, in the manner illustrated in FIGS. 2 and 3.

Figure 6:
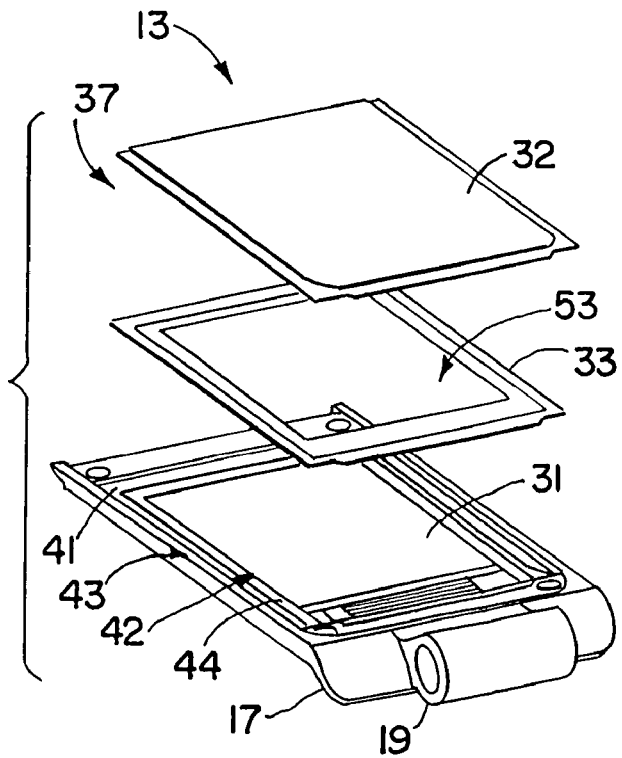
FIG. 6 is an exploded isometric view of a mount or retainer in which a display and window are to be mounted using dust sealing tape in accordance with an embodiment of the invention and illustrating a method of assembling a display system according to an embodiment of the invention.

FIG. 6 illustrates an example of assembling a display system 13 in accordance with an embodiment of the invention. The display system may be assembled from the front of the housing 17, e.g., the front of the housing may be the side at which the display 31 is viewed. This allows the back part 30b (FIGS. 2 and 3) of the front part 30 of the housing 17 to be a solid or substantially solid wall facing the inside of the rest of the housing 17a (FIGS. 2 and 3), for example, since there is no need for an opening through which the display 31 otherwise would have to be positioned and/or mounted in the front part 30. The solid or substantially solid wall may increase the strength, stiffness and durability of the housing 17 compared to a wall with a relatively large opening therein for mounting or positioning a display and, therefore, may increase the strength, stiffness and durability of the mobile phone. Furthermore, such increased strength, stiffness and durability may facilitate making the mobile phone thinner than a conventional thicker mobile phone while still having adequate strength, stiffness and durability of the thinner mobile phone. The display 31 is placed in the mounting recess 40 at the display recess 42 portion thereof from the front side of the front part 30 of the housing 17. The dust sealing tape forming the dust seal 33 is placed against the step surface 41 of the window recess 43. The adhesive material on the bottom surface of the second double-sided adhesive layer 52 is pressed against the display 31, e.g., by pressing against the exposed portion 51b of the foil layer 51 urging it toward the display causing the adhesive material at the bottom of the second double-sided adhesive layer 52 to adhere to the display. The window 32 may be placed against the dust sealing tape of the dust seal 33 to engage the adhesive material on the top surface of the first double-sided adhesive material layer 50; and the window may be urged toward the step surface 41 causing the adhesive material at the top of the first double-sided adhesive layer 50 to adhere to the window and the adhesive material on the bottom surface of the second double-sided adhesive layer 52 to adhere to the step surface 41. Therefore, the dust seal 33 attaches to both the display 31 and window 32 and to the housing 17 or to such other support structure as maybe provided for the display 31 and window 32; and the dust sealing tape providing the dust seal 33 blocks dust from entering the space 34 between the display and the window to tend to provide a dust-free environment in this space 34.

In testing and using the mobile phone 10, the dust seal 33 maintains attachment to the display, the window 32 and the display housing 17. In the event of physical size change or distortion of the housing, display, and/or window, the dust seal 33 is adequately flexible and in a sense forgiving of such dimensional changes to maintain such an attachment and to maintain such a dust blocking function described. Furthermore, the dust seal 33 maintains such an attachment and dust blocking effect over a relatively wide range of dimensional tolerance variations of the display system 13, and the space 34 is adequate to provide for such variations in dimensional tolerances.

It will be appreciated that the mobile phone 10 may be used in conventional manner, for example. The display 31 of the display system 13 with the dust sealing tape 33 blocking dust from the space 34 provides for good clear viewing of information on the display 31 as viewed through the window 32. Various other portions of the mobile phone 10, e.g., circuitry, antenna, power supply, programming, etc., as will be evident to those who have ordinary skill in the art, may be provided the mobile phone as may be conventional in the field of mobile phones.

Figure 7:
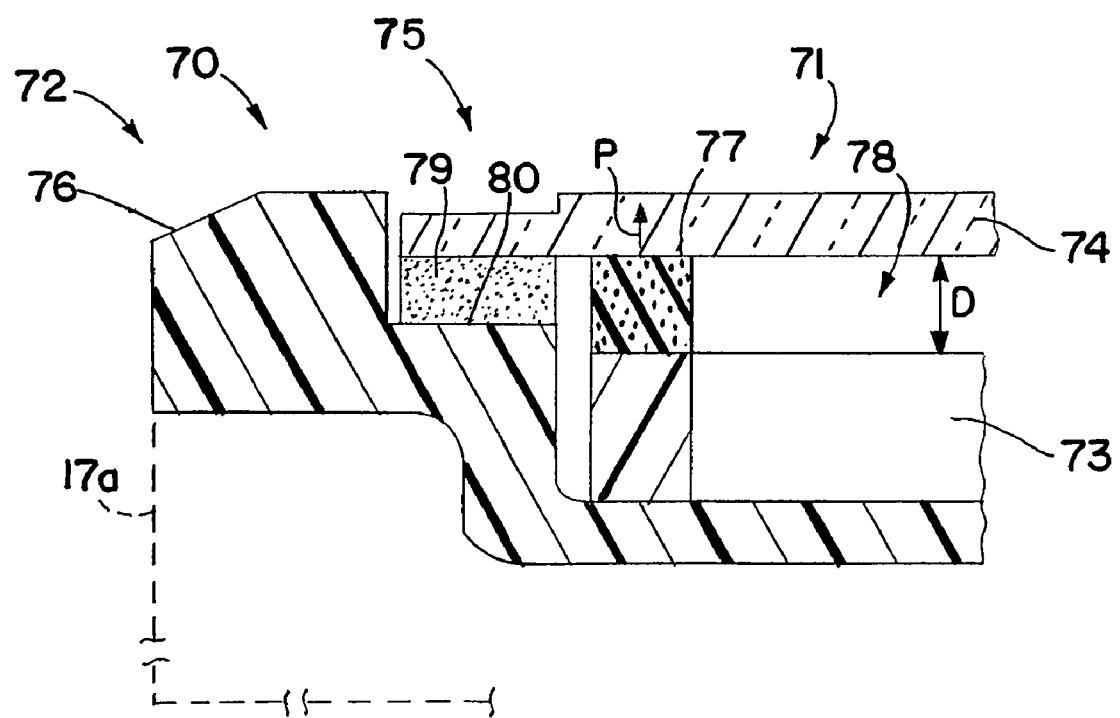
FIG. 7 is a schematic fragmentary section view of a prior art mounting system for a display and window using a foam gasket.

Briefly referring to FIG. 7, a prior art mounting system 70 for the display system 71 of a mobile phone 72 is illustrated. The display system 71 includes a display 73, e.g., a liquid crystal display, and a protective window 74, which are positioned in a mounting recess 75 of the mobile phone housing 76. The display 73 and window 74 are spaced apart from each other by a foam gasket 77, e.g., made from a polyurethane foam material. The foam gasket 77 is supposed to block dust from the space 78. Double sided adhesive material 79, e.g., double sided adhesive tape, adheres the window 74 to a mounting step 80 that circumscribes the mounting recess 75. There are several problems that may occur with the prior art mounting system 70. One problem is due to the foam gasket 77 being compressed between the display 73 and the window 74 when the display system 71 is assembled as the window is pressed against the double sided adhesive material 79 thereby to provide a dust seal for the space 78. Thus, the foam gasket 77 applies a pressure P against the window urging it away from the display, from the double sided adhesive material 79, and from the mounting step 80. When the mobile phone 72 is tested in relatively high humidity and temperature conditions, the adhesive material 79 may tend to release, e.g., the strength of adherence of the adhesive material to both the window 74 and the mounting step 80 may weaken to an extent that the double sided adhesive material 79 may not be capable to withstand the pressure exerted by the compressed foam gasket 77 and to maintain holding of the window 74 in place; and the window may fall off. Another problem may occur in relatively thin mobile phones in which it is necessary to decrease the distance D between the window 74 and the surface of the display 73. For example, for a relatively thin mobile phone the distance D between the window and display may be approximately 0.37 millimeters with tolerance variation of approximately plus or minus 0.2 millimeters. This means that the dimensional range is from a minimum of approximately 0.17 millimeters to approximately 0.57 millimeters. In the case of having to compress the foam gasket to approximately 0.17 millimeters thickness between the window and the display may further increase the pressure against the window 74 causing it to fall off in if the adhesive material adhesion to the window and mounting step and/or the cohesion of the adhesive material were to weaken too much.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

I claim:

1. A mounting system for a display, comprising
a support structure adapted to support a display and a viewing window in spaced apart relation to the display, and
a flexible attachment sealing the space between the window and the display and adapted to hold the window to the support structure,
wherein the support structure including a recess in which a display is positioned, and said flexible attachment having two surfaces, one surface positioned with respect to the support structure and attached thereto by adhesive and also attachable to a display in the recess, and the other surface exposed for attachment to a viewing window,
said support structure having a step recess about at least a portion of said recess and in which a viewing window is positioned, said stepped recess having a surface, and said one surface of said support structure being adhered to said stepped recess surface by adhesive, and
said flexible attachment including a flexible portion providing a bend maintaining integrity of the flexible attachment between a portion thereof attached to the support structure and a portion thereof attachable to a display in said recess to accommodate displays of different respective thickness dimensions thereby allowing for a relative height differential between the step recess and a display supported by the support structure.

2. A mounting system for a display, comprising
a support structure adapted to support a display and a viewing window in spaced apart relation to the display, and
a flexible attachment sealing the space between the window and the display and adapted to hold the window to the support structure, said flexible attachment comprising an annular ring including a radially outer portion having adhesive material on both surfaces providing, respectively, adhesive attachment to the support structure and attachable to a viewing window, the annular ring including a radially inner portion having adhesive material on one surface attachable to a display and having a substantially non-adhesive surface exposed to but not attachable to a viewing window.

3. The mounting system of claim 2, said annular ring comprising
a first annular ring of double sided adhesive tape adapted to attach to a window,
a second annular ring of double sided adhesive tape adapted to attach to both said support structure and a display, and
an interface of non-adhesive material between and adhesively adhered to both annular rings of double sided adhesive tape.

4. A mounting system for a display, comprising
a support structure adapted to support a display and a viewing window in spaced apart relation to the display, and
a flexible attachment sealing the space between the window and the display and adapted to hold the window to the support structure,
said support structure including a housing, a display in the housing, and said support structure including a viewing window support surface, a viewing window, and said flexible attachment comprising one portion adapted to provide an interface between said viewing window support surface and said viewing window, said one portion adhesively attached to both said viewing window support surface and viewing window, said flexible attachment comprising another portion adhesively attached to said display and including an adhesive-free surface facing said viewing window and unattached to said viewing window, said flexible attachment having flexibility and adapted to permit separation of said viewing window and said display while maintaining a substantially isolated space between said viewing window and said display to block dust from entering such space.

5. The mounting system of claim 4, said housing comprising a mobile phone housing, and said display comprising a mobile phone display.

6. A display system, comprising
a housing,
a display in the housing,
a protective viewing window spaced apart from and aligned for viewing therethrough of the display, and
a dust seal between the window and the display attaching the window to the housing and adapted to block dust from space between the viewing window and the display, said dust seal comprising:
a first annular ring of double sided adhesive tape adapted to attach to said viewing window,
a second annular ring of double sided adhesive tape adapted to attach to both a retainer and said display, and an interface of non-adhesive material between and adhesively adhered to both annular rings of double sided adhesive tape.

7. The display system of claim 6, wherein the dust seal is attached to the housing, to the viewing window and to the display and is adapted in cooperation with the housing, viewing window and display to block dust from entering the space between the viewing window and the display.

8. The display system of claim 7, said display comprising a liquid crystal display.

9. The display system of claim 7, comprising a portable communication device.

10. The display system of claim 9, said portable communication device comprising a mobile phone.

11. The display system of claim 6, said housing having a recess, said display positioned at least partly in said recess, said housing having a support surface in generally parallel, spaced apart relation with a surface of said display and substantially circumscribing said recess and adapted to provide support for said viewing window with respect to the housing, said dust seal being in interface relation to said support surface and said viewing window attaching said viewing window to said support surface, and said dust seal attached to said display and in cooperation with said viewing window and display defining a dust sealed space between said viewing window and said display.

12. The display system of claim 6, said dust seal being flexible to maintain the sealed integrity of said space over a range of variation between said viewing window and said display.

13. A dust seal for a display held in a retainer and protected by a viewing window, comprising:
   a first annular ring of double sided adhesive tape adapted to attach to a window,
   a second annular ring of double sided adhesive tape adapted to attach to both a retainer and a display, and
   an interface of non-adhesive material between and adhesively adhered to both annular rings of double sided adhesive tape.

14. The dust seal of claim 13, wherein the first and second annular rings and said interface are generally planar, the radial width of said first annular ring is narrower than the radial width of said second annular ring, and the relationship of said first annular ring, said second annular ring and said interface is such that the radial outward portion of said interface has adhesive material at both surfaces thereof provided, respectively, by said first annular ring and said second annular ring, and the radial inward portion of said interface has adhesive material only at one surface thereof provided by said second annular ring.

15. The dust seal of claim 14, said interface comprising a foil material.

16. A method of assembling a display system using sealing tape that comprises a first annular ring of double sided adhesive tape, a second annular ring of double sided adhesive tape; and an intermediate material between said rings and adhered to both said rings by adhesive material of said rings, the method comprising
   placing one annular ring of double sided adhesive tape against a surface of a display and against a surface of a retainer in which the display is to be mounted,
   placing a window in at least partially overlying spaced apart relation to the display and against the other annular ring of double sided adhesive tape thereby to mount the window directly to the sealing tape to hold the window to the retainer.

17. A method of assembling a display system using dust sealing tape, comprising
   placing a first annular ring of adhesive material having a width W against a surface of a display and against a surface of a retainer in which the display is to be mounted,
   placing a window in at least partially overlying spaced apart relation to the display and against a second annular ring of adhesive material having a relatively narrower width W' compared to the relatively wider width W of the first annular ring of adhesive material, and
   wherein the two annular rings of adhesive material are adhered together and the window is mounted to the retainer by the annular rings.

18. The method of claim 17, said placing steps comprise applying force for the first and second annular rings to adhere, respectively, to a display in the retainer and to said window to provide a dust blocked sealed space between the display and the window.

19. The method of claim 17, wherein the retainer comprises a housing of a portable communication device, and further comprising placing a display in the housing.

* * * * *